Jan. 26, 1932.   C. G. STRANDLUND   1,842,808
GAUGE WHEEL FOR PLOWS
Filed Nov. 12, 1928
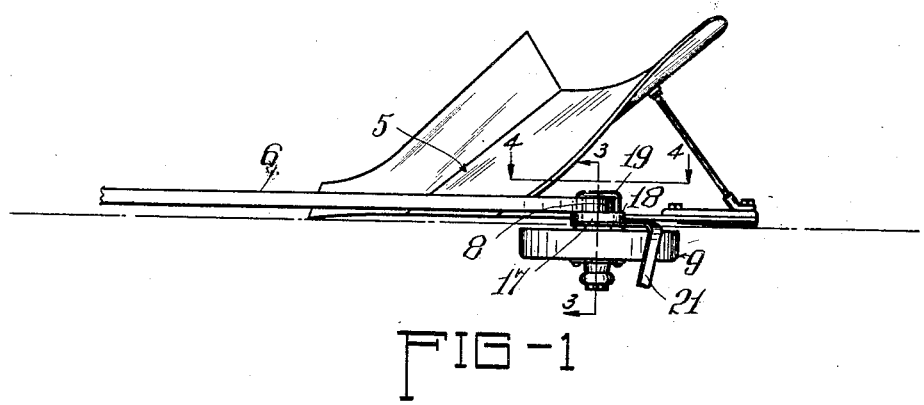
FIG-1
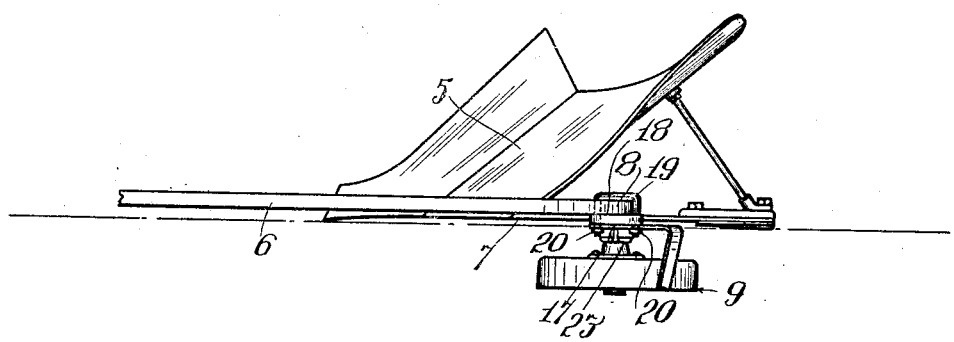
FIG-2
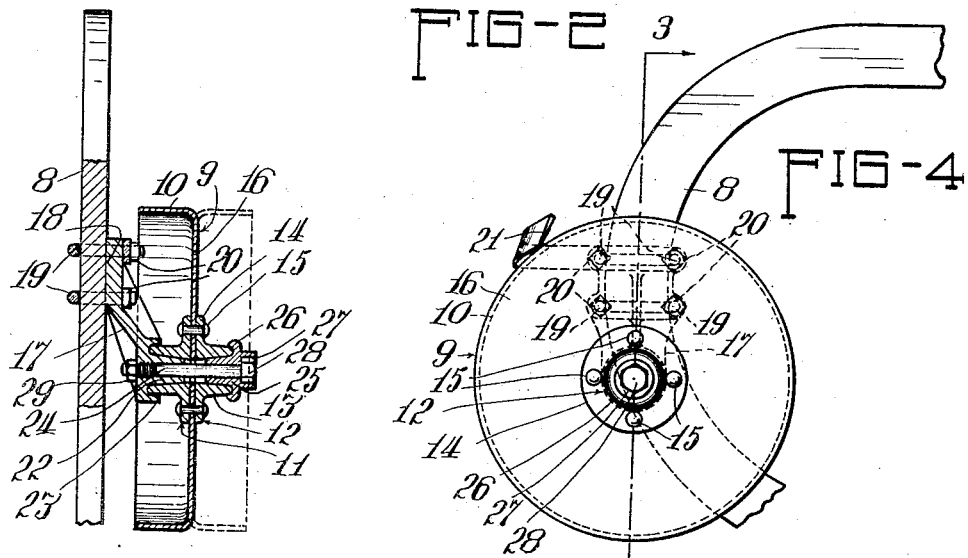
FIG-3
FIG-4
WITNESS
Walter Ackerman
INVENTOR
Carl G. Strandlund,
BY Brown, Jackson, Boettcher & Dienner.
ATTORNEYS Patented Jan. 26, 1932

1,842,808

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

GAUGE WHEEL FOR PLOWS

Application filed November 12, 1928. Serial No. 318,631.

This invention relates to plows, and has for its object to provide improved means for limiting or gauging the depth of plowing, and for relieving the plow beam and the usual lifting and depth regulating connections of the excessive strains to which they are subjected in plows having the common form of gauge wheel located behind the plow and secured to the beam in a trailing position. I accomplish this object as illustrated in the drawings and as hereinafter described. What I regard as new is set forth in the claims.

My invention consists in providing a plow with a gauge wheel adapted to be attached to the plow standard so as to run on the land opposite the mold board and at a distance from the landslide that may be varied to suit the condition of the soil. The gauge wheel may also be adjusted vertically with reference to the plow standard to gauge the depth of plowing.

In some soils the furrow wall tends to break away or crumble, and while it is desirable to locate the gauge wheel close to the furrow wall, this tendency of the soil to break away frequently makes it necessary to set the gauge wheel far enough away from it to avoid breaking it down. Furthermore, the common practice has been to secure the gauge wheel to the plow standard by a rearwardly extending connection, so that the gauge wheel trails behind the plow, notwithstanding the fact that this is objectionable because it imposes undue strain on the usual lifting and depth regulating connections with which gang plows are generally equipped. It also imposes more strain on the plow beam and makes gauging less accurate than where the gauge wheel is located opposite the landside, i. e. at a point lying between the transverse vertical planes of the plow body, as is the case in my improved construction.

The nature of my improvements will be readily understood from the following description thereof in connection with the drawings, in which—

Fig. 1 is a plan view of the rear plow body of a gang plow showing my improved gauge wheel attached thereto in close proximity to the furrow wall;

Fig. 2 is a similar view showing the furrow wheel set at a considerable distance from the furrow wall;

Fig. 3 is an enlarged detail, being a vertical cross-section on lines 3—3 of Figs. 1 and 4; and Fig. 4 is a partial longitudinal vertical section on line 4—4 of Fig. 1.

It will be understood that while in the drawings I have illustrated only a single plow body with a portion of its beam, the illustrations are to be considered as representing part of a plow of any suitable type, such as a gang plow provided with the usual lifting and depth regulating appliances, or a two-way plow, such as that shown and described in my pending application, Serial No. 260,872, filed March 12, 1928.

Referring to the drawings,—5 indicates a mold board plow having a beam 6 and landside 7. The rear portion of the beam, as usual, is curved downwardly to form a standard 8 to which the plow body is attached in any suitable way.

The gauge wheel is indicated as an entirety by the reference numeral 9. It is preferably of the disc type and is provided with a peripheral flange 10 that extends laterally at one side of the radial portion of the wheel, as best shown in full lines in Fig. 3. In other words, the gauge wheel is in the form of a disc having a peripheral flange at one side thereof that extends parallel with its axis and constitutes the tread or rim portion of the wheel.

The hub of the wheel is composed of two similar members 11, 12 each comprising a sleeve portion 13 and an annular radial flange 14. These two hub members are secured, as by rivets 15, to opposite sides of the radial portion 16 of the wheel concentrically with its axis, so that their sleeve portions 13 extend in opposite directions from such radial portion. As clearly shown in Fig. 3, the rivets 15 preferably extend through the radial flanges 14 of both hub members and through the radial portion 16 of the wheel, so that a single set of rivets secures both hub portions in position on the wheel.

The inner surfaces of the sleeves 13 are preferably conical with their greatest diameter at their outer ends, and constitute the bearing surfaces on which the wheel is axially supported.

A bracket 17 having a flattened surface 18 at its upper end serves as means for rotatably supporting the wheel 9 and attaching it to the plow standard 8. The flattened portion 18 is adapted to bear against the standard 8 and to be adjustably secured thereto by clamping bolts 19. These are preferably U-bolts that embrace the standard 8 and part 18 of the bracket 17 and are secured by nuts 20. Preferably a scraper 21 is connected to the arms of the upper bolt 19, and is held in place by the nuts 20 thereon, as shown in Figs. 1 and 3. This scraper extends over the tread portion 10 of the gauge wheel and serves to remove soil therefrom as the wheel rotates.

At its lower end the bracket 17 is provided with a conical bearing 22 at the base of which is a circular flange 23, thus providing a pocket to receive the outer margin of the sleeve portion 13 of the hub portion 11, when the parts are arranged as shown in Fig. 3, or the outer margin of the opposite sleeve 13, when the gauge wheel is in its reverse position indicated by dotted lines in said figure. A bolt 24 extends through the bearing 22, and through the sleeves 13, and upon the outer end of this bolt is mounted a detached bearing 25 similar in shape to the bearing 22.

The bearing 25 is adapted to fit in the outer sleeve 13, and it is provided with a marginal flange 26 that overlies the outer margin of such sleeve. The bearing 25 is provided with a pocket 27 at its outer end which receives the head 28 of the bolt 24, and a nut 29 is screwed upon the inner end of said bolt to hold the two bearings 22, 25 together and provide for their adjustment with reference to each other and to the sleeves 13.

It will be seen from the foregoing description that the gauge wheel is provided with two alined hub members that extend in opposite directions from the radial web portion 16 thereof, one of which lies under the tread of the wheel while the other projects outwardly beyond such tread. Either of these hub portions may be mounted upon the bearing 22 of the bracket 17 to adjust the position of the tread portion 10 toward or from the plow standard 8, thereby locating such tread portion either close to the standard or at a distance therefrom equal to the width of the tread portion, as clearly appears from Figs. 1, 2 and 3. Where the hub member 11 is mounted on the bearing 22 the tread portion 10 extends toward the standard and lies in close proximity thereto, whereas by reversing the gauge wheel and mounting the hub portion 12 on the bearing 22 the tread portion 10 may be arranged to extend away from the plow standard 8 and be located at a considerable distance from said standard, as indicated by the dotted lines in Fig. 3. In either case the gauge wheel is rotatably supported by the two bearings 22, 25, and is held in place by the bolt 24.

It will be understood that the dotted line position of the gauge wheel is used where the soil is of such character that the furrow wall tends to break away, whereas the full line position is used where the soil is firm and there is little if any such tendency.

Location of the gauge wheel close to the landside makes for accurate gauging, because the gauge wheel follows the contour of the ground adjacent to the plow, and this result is also promoted by securing the gauge wheel to the plow standard so that it lies between the transverse vertical planes of the plow body. A further advantage of thus mounting the gauge wheel is that it relieves the strain on the lifting and depth regulating connections of the plow, and, in the case of a two-way plow, such as that shown in my said application Serial No. 260,872, when the plow is adjusted at its front end it turns about the gauge wheel and less strain is thrown on the beam. The gauge wheel may readily be adjusted vertically along the plow standard by loosening the clamping bolts 19.

I claim:

1. In a plow, the combination with a standard and a plow body carried thereby, of a gauge wheel for regulating the depth of penetration of the plow body having a rim projecting laterally at one side thereof, bearing members secured to said wheel concentrically with the axis thereof, one of said members lying within said rim and the other projecting in the opposite direction, and bearings for said bearing members supported by said standard at the landward side of the plow.

2. In a plow, the combination with a standard and a plow body carried thereby, of a gauge wheel for regulating the depth of penetration of the plow body comprising a disc having a peripheral flange projecting at one side thereof to form the wheel rim, bearing members in the form of sleeves secured to opposite sides of said disc concentrically with the axis thereof, a bracket supported by said standard at the landward side thereof, bearings fitted in said sleeves, said bearings having annular recesses to receive the outer end portions of said sleeves, and a bolt supported by said bracket and extending through said bearings for securing them together, said disc being reversible on said bearings for selective mounting thereon to position said rim closer to or farther from the landside of said plow.

3. In a plow, the combination with a standard and a plow body carried thereby, of a gauge wheel positioned to engage the land substantially opposite the mold board of the plow, said gauge wheel being adjustable to vary the position of the rim portion only thereof from the plow body in a lateral direction, and means securing the gauge wheel to the standard, and adjustable to vary the position of the gauge wheel vertically.

4. In a plow, the combination with a standard and a plow body carried thereby, of a gauge wheel for regulating the depth of penetration of the plow body comprising a disc having a lateral peripheral flange extending to one side of the normal plane of said disc to form the wheel rim, bearing members secured to opposite sides of said disc, and bearings for said bearing members supported by said standard at the landward side of the plow, said bearing members being adapted to seat on said bearings so that the flange may extend to the other side of the plane of said disc when said disc is reversed.

5. In a plow, the combination with a standard and a plow body carried thereby, of a gauge wheel for regulating the depth of penetration of the plow body comprising a disc having a lateral peripheral flange extending to one side of the normal plane of said disc to form the wheel rim, bearing members in the form of sleeves secured to opposite sides of said disc, and bearings for said sleeves supported by said standard at the landward side of the plow, said bearing members being adapted to seat on said bearings so that the flange may extend to the other side of the plane of said disc when said disc is reversed.

6. In a plow, the combination with a standard and a plow body carried thereby, of a gauge wheel carried by said standard so as to run on the land, said wheel comprising a disc having a peripheral flange extending laterally from one side thereof to form the wheel rim, bearing members on said disc, and bearings on said standard, said disc being reversible on said bearings for selective mounting thereon so that the peripheral center of the rim lies closer to or farther from the landside of said plow.

7. In a plow, the combination with a standard and a plow body carried thereby, of a gauge wheel carried by said standard and comprising a disc having a peripheral flange extending laterally from one side thereof to form the wheel rim, bearing members on said disc, bearings on said standard, said disc being reversible on said bearings for selective mounting thereon so that the peripheral center of the rim lies closer to or farther from the landside of said plow, and means for adjusting said gauge wheel vertically relatively to said standard.

8. In a plow, the combination with a standard and a plow body carried thereby, of a gauge wheel carried by said standard for regulating the depth of penetration of the plow body comprising a disc having a peripheral flange extending laterally from one side thereof to form the wheel rim, bearing members on said disc, and bearings on said standard at the landward side of said plow, said disc being reversible on said bearings for selective mounting thereon so that the peripheral center of the rim lies closer to or farther from the landside of said plow.

9. In a plow, the combination with a standard and a plow body carried thereby, of a gauge wheel positioned to engage the land substantially opposite the mold board of the plow, said gauge wheel being reversible to vary the position of the rim portion only thereof from the plow body in a lateral direction, and means securing the gauge wheel to the standard, and adjustable to vary the position of the gauge wheel vertically.

CARL G. STRANDLUND.